No. 687,759. Patented Dec. 3, 1901.
J. B. KIBLER.
PERCOLATOR.
(Application filed Apr. 5, 1901.)
(No Model.)
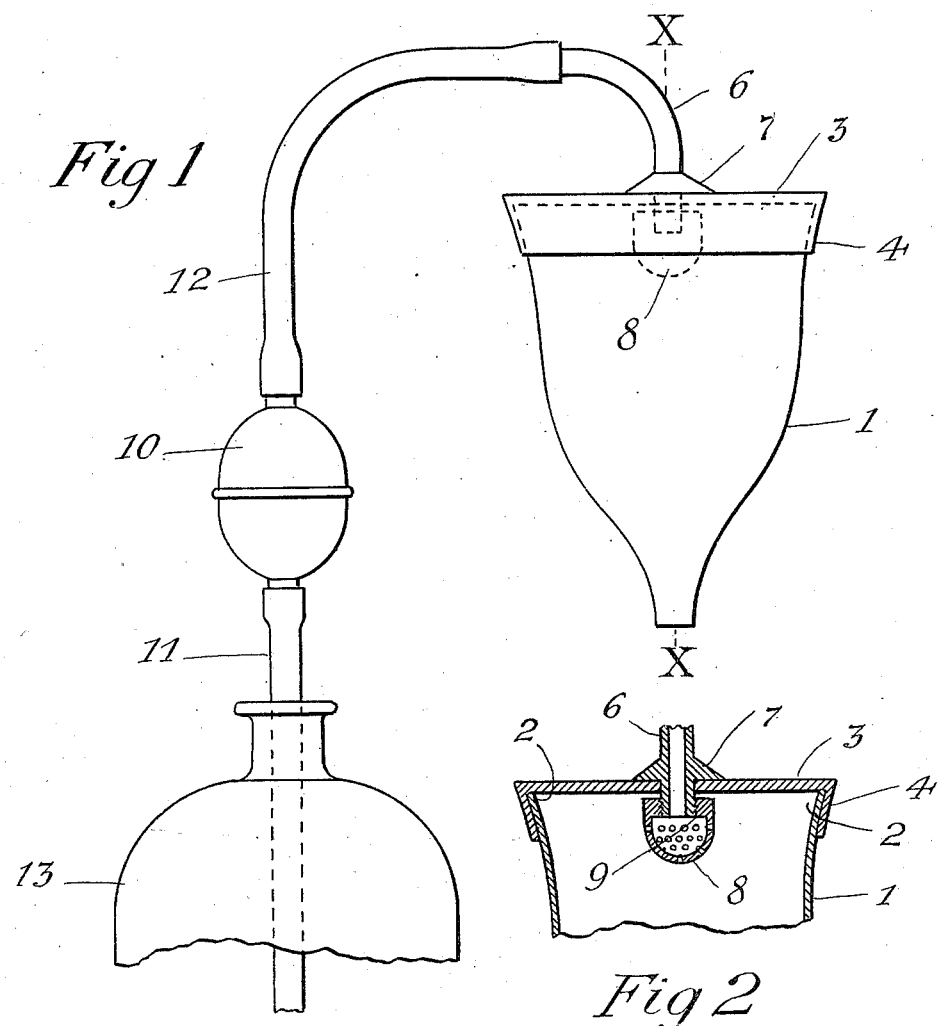
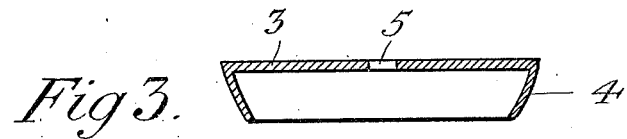
Witnesses
Theo Lagaard.
M. F. Harrison
Inventor
John B. Kibler
By P. H. Gunckel
his Attorney.

UNITED STATES PATENT OFFICE.

JOHN B. KIBLER, OF BUFFALO, NEW YORK.

PERCOLATOR.

SPECIFICATION forming part of Letters Patent No. 687,759, dated December 3, 1901.

Application filed April 5, 1901. Serial No. 54,428. (No model.)

*To all whom it may concern:*

Be it known that I, JOHN B. KIBLER, a citizen of the United States, residing at Buffalo, in the county of Erie and State of New York, have invented certain new and useful Improvements in Percolators, of which the following is a specification.

My invention relates to percolators or filters, and particularly to the class of percolating or filtering devices adapted for pharmaceutical purposes. The common practice in conducting the operation of filtration or percolation is to pack the drug, compound, or substance in an ordinary pharmaceutical percolator open at the top and to gradually pour the solvent or menstruum upon it until the desired quantity of the liquid has passed through. Frequently the solvent or the product of its action upon the substance in the percolator is of a volatile nature, and because of the atmospheric exposure there is a considerable loss of the solution by evaporation, resulting at times in the loss of the desired active properties of the solution and at other times in filling the room with noxious fumes or disagreeable odors, and, furthermore, the process of percolation is often tediously slow. It is the object of my improvements to overcome these and other objections by providing a closed percolator and means for introducing the solvent or menstruum into it and means for increasing the air-pressure in the percolator-chamber.

My improvements are illustrated in the accompanying drawings, in which—

Figure 1 is a side elevation of a percolator embodying my improvements. Fig. 2 is a central vertical section of the upper portion of Fig. 1 on the line *x x*, and Fig. 3 shows the elastic percolator-cover detached.

In such drawings, 1 designates an ordinary percolator-body of somewhat funnel form and having a flaring or bell-mouth lip 2, and 3 a removable cap or cover, preferably composed of rubber and suitably flexible and elastic and having a relatively wide downward and inwardly inclined rim or flange 4, adapted to fit tightly over the lip 2 of the percolator-body. This cap has a central opening 5, through which is passed the downturned end portion of a hook-shaped hard-rubber or metal or other suitable tube 6. A flanged shoulder 7 on the tube seats on the upper surface of the cap, and beneath the cap a rose-head or perforated nut 8 is screwed onto the threaded end 9 of the tube, and the cap is firmly clamped between the flange 7 and nut 8, and the cap 3 and tube 6 are thereby secured together. The cap, with the tube 6 thus attached to it, may then be secured on the percolator-rim.

In use the outer end of the tube 6 is connected to the discharge-tube of an ordinary syringe, having a bulb 10, a suction-tube 11, and a discharge-tube 12. When so connected, the suction-tube 11 is inserted in a bottle 13 or other vessel containing the menstruum and the syringe operated to force the liquid through the tubing and rose-head and spray it evenly over the surface of the substance contained in the percolator-chamber. The parts of the apparatus may be so fitted as to permit the entire process of filtration to be conducted without exposure of the liquid to the atmosphere, and thus most of the objections to the customary methods of filtration may be successfully avoided.

To hasten the process of percolation, if desired, after a portion of the solvent has been so introduced the suction-tube 11 may be lifted out of the body of solvent in the bottle and the syringe operated to pump air into the percolator-chamber. The elasticity of the cap will permit it to bulge upward when subjected to such air-pressure, and so aid in maintaining a steady air-pressure in the percolator-chamber.

Having described my invention, what I claim is—

1. In a percolator, the combination with a vessel having a flaring rim, of an elastic cover adapted to engage such rim, a tube extending through the cover, a spraying device thereon beneath the cover, and a pumping device for forcing liquid through the tube and sprayer, substantially as set forth.

2. In a percolator, the combination with a vessel having a flaring rim, of an elastic cover adapted to engage such rim, a tube extending through the cover, a device thereon beneath the cover for spraying liquid, and means for forcing liquid through said tube and spraying device, substantially as set forth.

3. A detachable cover for a percolator, comprising a flexible or elastic body provided with an inlet-tube and spraying device, in combination with a pumping device, substantially as set forth.

In testimony whereof I have hereunto set my hand this 23d day of March, 1901.

JOHN B. KIBLER.

In presence of—
ERNEST R. TEASDALE,
EMERSON R. SAWYER.